Sept. 6, 1932.   D. J. STEWART   1,875,672
VALVE OPERATOR
Filed April 23, 1930
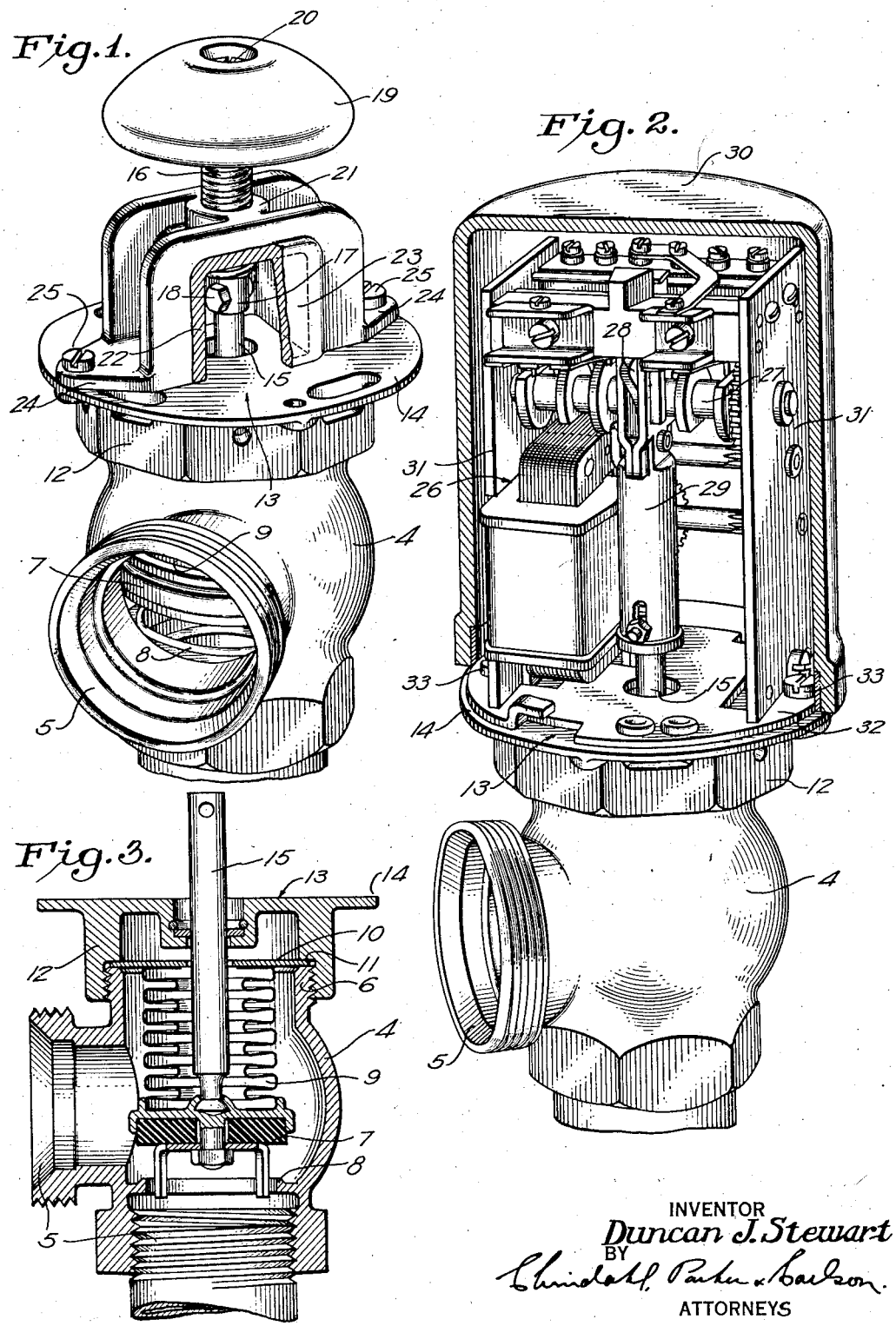

Patented Sept. 6, 1932

1,875,672

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

VALVE OPERATOR

Application filed April 23, 1930. Serial No. 446,461.

This invention relates to operators for valves such as are used in heating systems for buildings and more particularly to a combined valve and hand operator therefor.

Modern heating systems are commonly adapted for control by individual room thermostats, each of which is arranged to govern a power operator by which a radiator valve is opened and closed. Preferably, the power operators are not installed on their valves until the piping has been thoroughly cleared of foreign material by "blowing out" the system. During this initial operation of the system, it is desirable that the valves be equipped with operating means by which they may be opened and closed.

The primary object of the present invention is to combine with a heat control valve a new and improved operator by which the valve may be actuated by hand and which is detachably associated with the valve in a manner such as to permit the operator to be removed as a unit and replaced by another hand or power operator without unsealing the heating system.

The invention also aims to provide a hand operator of the above character which is inexpensive and readily replaceable by reason of the particular structural character of its parts and which is interchangeable with a power operator of the type disclosed in a copending application Serial No. 417,989, filed Jan. 2, 1930, by myself and Howard D. Colman.

Other objects and advantages of the invention will become apparent from the following detailed description taken in connection with the accompanying drawing, in which Figure 1 is a perspective view of a valve equipped with an operator embodying the features of the present invention.

Fig. 2 is a perspective view of a valve equipped with an electric operator, the casing of which is shown in section.

Fig. 3 is a vertical sectional view through the valve shown in Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawing, the hand operator is applied to a valve of the so-called packless type including a body or casing 4 with inlet and outlet openings 5 and an auxiliary opening defined by a tubular projection 6 at the top of the valve casing. Communication between the inlet and outlet openings is controlled by a valve member in the form of a disk 7 which is mounted within the casing for movement toward and from a seat 8.

In order to seal the auxiliary opening and enable the valve member to be actuated by means which is freely reciprocable through such opening, the disk 7 is secured to one end of a bellows diaphragm 9 having a plurality of convolutions which render the diaphragm as a whole freely extensible and contractible. The other end of the bellows is sealed to a disk 10, the outer peripheral edge of which overlaps the end of the tubular projection 6. The disk 10 is clamped against the end of the projection 6 and the valve casing thereby effectually sealed by a cap 13 having an annular shoulder 11 on a flange 12 screw-threaded onto the projection 6. In the present instance, the cap has a flat upper surface formed in part by a peripheral flange 14.

In the present instance the valve member is arranged to be actuated by an endwise movable stem 15 which extends axially through the diaphragm 9 and central apertures in the cap 13 and disk 10. At its lower end the stem is permanently connected to the valve disk, the joint permitting the stem to be rotated relative to the valve member and affording some degree of universal movement so that the disk may adapt itself to the seat 8.

The other end portion of the stem is freely reciprocable through the cap 13 and is arranged to be actuated by a detachable operating unit comprising a frame member generally designated by the numeral 22 and supporting an actuating element for moving the valve member between open and closed positions and maintaining the member in actuated position relative to the valve casing. Preferably, the actuating element is in the form of a screw 16 threading through the frame member 22 and having at the lower end a tubular projection 17 which fits over the upper end of the stem 15 and is secured thereto by a bolt 18 projecting through transverse bores in the stem. The shaft may be turned conveniently by means of a hand wheel 19 of any desired shape. For a purpose to later appear, the handle is made rigid with the upper end of the shaft by means such as a screw 20 which permits detachment of the handle for a purpose which will appear later.

In the present instance, the frame member 22 is in the form of a U-shaped yoke adapted to rest in inverted position upon the upper flat surface of the cap 13. The shaft 16 threads through a hub 21 of the yoke which has side walls 23 defining a downwardly opening recess in which the detachable connection between the shaft 16 and the stem 15 is housed.

Projecting outwardly from the frame member are two lugs 24 which lie flat against the cap 13 and are adapted to be secured thereto by screws 25 entering the flange 14 of the cap. The frame member is thus rendered readily detachable from the cap 13.

From the foregoing, it will be observed that a bonnet has been provided for the valve which is composed of two readily detachable parts, one of which supports the actuating element or shaft 16 for movement relative thereto and cooperates with this element to maintain the position of the valve after actuation thereof by the handle 19. The other part of the bonnet cooperates with the diaphragm 9 to support the valve member and seal the auxiliary opening through which the connection between the valve and operator extends.

Thus the frame member 22 and the screwshaft, which constitute means for reciprocating the valve member and maintaining it in actuated position, are detachable as a unit from the valve proper without opening the piping of the heating system. To this end, the screws 25 are removed and the handle 19 taken off from the shaft 16. Then the frame member 22 is raised to afford access to the bolt 18 which may be accomplished by turning either the shaft or the yoke in the proper direction. The detachment is completed by removal of the bolt 18.

The hand operator above described is interchangeable with and the cap 13 and stem 15 are especially constructed to accommodate a power operator such as is shown in Fig. 2. This operator comprises an electric motor 26 connected through a speed reduction gear train to a shaft 27 carrying a cam 28 which acts on a follower 29 to impart motion in opposite directions to the stem 15. These parts are mounted within a cover 30 on a frame having spaced standards 31 upstanding from a base plate 32 which is adapted to rest upon the flat top surface of the cap 13 and to be securely fastened thereto by screws 33. The upper end of the stem 15 projects through the plate 32 and may be readily connected to the lower end of the follower 29 by a bolt connection similar to that used with the hand operator above described.

In view of the interchangeability of the hand and electric operators above described, it will be apparent that all or any part of a building having a heating system equipped with the present valve operators may be adapted for automatic regulation at any desired time after the initial installation and testing. Such addition would merely involve replacement of the hand operators by electric operators inasmuch as the valves proper and the caps 13 are usable with either type of operator.

I claim as my invention:

1. The combination of a valve casing having an opening therein, a valve member controlling a passageway through said casing by movement toward and from a seat therein, a stem projecting through said opening and having a connection with said member which permits rotation of the stem relative to the member, means sealing said casing against the escape of fluid while permitting free reciprocation of said stem including a cap enclosing said opening, a frame member detachably secured to said cap and removable therefrom without detachment of said cap from said casing, and an actuating shaft screw-threaded through said frame member and detachably connected to said stem for rotation therewith whereby turning of said shaft and stem in opposite directions will effect reciprocation of said valve member toward and from its seat.

2. The combination of a valve casing having an opening therein, a valve member controlling a passageway through said casing by movement toward and from a seat therein, a stem connected at one end to said member with its other end projecting through said opening, means supporting said member for reciprocation toward and from its seat and sealing said opening including a cap screw-threaded onto said casing around the opening, an inverted U-shaped frame member having its opposite ends detachably secured to said cap, said frame member providing a housing in which the upper end of said stem is disposed, a screw alined with said stem and threading through said frame member, means within said housing detachably connecting said stem and screw, and an operating handle on the other end of said screw by which the screw may be turned to effect reciprocation of said valve member.

3. The combination of a valve casing having an opening therein, a valve member controlling a passageway through said casing by movement toward and from a seat therein, a stem connected at one end to said member with its other end projecting through said opening, means supporting said member for reciprocation toward and from its seat and sealing said opening including a cap screw-threaded onto said casing around the opening, an inverted U-shaped frame member having its opposite ends detachably secured to said cap, said frame member providing a housing in which the upper end of said stem is disposed, a screw alined with said steam and threading through said frame member, means within said housing detachably connecting said stem and screw, and an operating handle rigid with but detachable from the other end of said screw to permit said detachable connecting means to be rendered accessible by effecting relative rotation between said frame member and said actuating element.

4. The combination of a valve casing having communicating inlet and outlet openings and an auxiliary opening, a valve member adapted to be seated in said casing and controlling communication between said inlet and outlet openings, a cap adapted to be secured to said casing around said auxiliary opening, a bellows diaphragm within said casing having one end secured to said casing by said cap and the other end secured to said valve member whereby the latter is supported for movement toward and from its seat and the auxiliary opening is sealed against the escape of fluid, a frame member detachably secured to said cap externally thereof, a manually operable actuating element mounted on said frame member for movement relative thereto and adapted to be maintained in actuated position by the frame member, and means providing a detachable connection between said element and valve member which connection extends through said cap, said auxiliary opening and said bellows diaphragm.

5. The combination of a valve casing having communicating inlet and outlet openings and an auxiliary opening, a valve member controlling communication between said inlet and outlet openings and having a stem extending through said auxiliary opening, means supporting said member for movement and sealing said auxiliary opening against the escape of fluid including a cap mounted on said casing around said auxiliary opening, and manually operable means for actuating said member including a frame member detachably secured to said cap and an operating handle having a detachable connection with the valve stem extending through said auxiliary opening, said handle being movably mounted on said frame member and cooperating therewith to main the position of the valve member after actuation of the valve by the handle.

6. The combination of a valve casing, means sealing an opening in said casing including a cap, a valve member controlling a passageway through said casing, a stem freely reciprocable through said cap joined at its inner end to said valve member and adapted to be detachably connected at its outer end to a self-contained power driven unit, said cap being constructed to provide a support on which said power unit is adapted to be detachably mounted whereby to permit removal of the unit without unsealing the opening in the valve casing, and a hand operating unit interchangeable with said power unit and including a handle detachably connectible with the outer end of said stem and a frame member supporting said handle and adapted to be detachably mounted on said cap.

7. The combination of a valve casing, means sealing an opening in said casing including a cap, a movable valve member controlling a passageway through said casing and arranged to be actuated by a self-contained power driven unit adapted to be mounted on said cap externally of said casing and adapted for detachment from the cap without unsealing the opening in the casing, and a hand operator adapted to be mounted on said cap and interchangeable with said power driven unit, said cap thereby serving as a support for the hand operator as well as the power driven unit.

8. The combination of a sealed valve casing having a valve member therein operable from the exterior of the casing, said casing being adapted to support a detachable power unit, arranged for operative association with said valve member and adapted to be removed from said casing without unsealing the latter, and a hand operator for actuating said valve member between open and closed positions and maintaining such positions, said hand operator being interchangeable with said power unit and adapted to be mounted on said casing to permit removal of the hand operator without unsealing the casing.

In testimony whereof, I have hereunto affixed my signature.

DUNCAN J. STEWART.